United States Patent [19]

Roddy

[11] Patent Number: 5,194,980
[45] Date of Patent: Mar. 16, 1993

[54] THRESHOLDED, HIGH POWER LASER BEAM SCANNING SYSTEM

[75] Inventor: James E. Roddy, Rochester, N.Y.

[73] Assignee: Eastman Kodak Company, Rochester, N.Y.

[21] Appl. No.: 890,452

[22] Filed: May 29, 1992

[51] Int. Cl.$^5$ .................. G02B 26/08; G02B 27/10
[52] U.S. Cl. .................. 359/204; 359/206; 359/618; 250/578.1
[58] Field of Search ............ 359/204, 205, 206, 618, 359/625, 629, 634, 639, 17, 18, 831, 837; 250/578.1; 346/108

[56] References Cited

U.S. PATENT DOCUMENTS

| | | | |
|---|---|---|---|
| 3,430,048 | 2/1969 | Rubinstein | 250/199 |
| 3,447,856 | 6/1969 | De Lange et al. | 250/199 |
| 3,584,221 | 6/1971 | Furakawa | 250/199 |
| 3,982,819 | 9/1976 | Letellier | 359/832 |
| 4,274,101 | 6/1981 | Kataoka | 364/108 |
| 4,335,939 | 6/1982 | Stovell et al. | 359/256 |
| 4,562,462 | 12/1985 | Egan | 358/75 |
| 4,566,761 | 1/1986 | Carlsen | 350/495 |
| 4,634,232 | 1/1987 | Takeoka | 359/487 |
| 4,740,061 | 4/1988 | Miura | 359/495 |
| 4,744,075 | 5/1988 | Buhrer | 370/3 |
| 4,786,126 | 11/1988 | Kramer | 359/17 |
| 4,796,961 | 1/1989 | Yamada et al. | 359/217 |
| 4,800,556 | 1/1989 | Charlier et al. | 370/3 |
| 4,822,151 | 4/1989 | Tatsuno et al. | 359/495 |
| 4,826,268 | 5/1989 | Kramer | 346/108 |
| 4,900,598 | 2/1990 | Suzuki | 428/604 |
| 4,912,696 | 3/1990 | Feyrer et al. | 369/100 |
| 4,916,465 | 4/1990 | Van Tongeren et al. | 346/108 |
| 4,924,321 | 5/1990 | Miyagawa et al. | 358/296 |
| 4,961,079 | 10/1990 | Owens et al. | 359/618 |
| 4,962,312 | 10/1990 | Matuura et al. | 346/108 |
| 4,969,141 | 11/1990 | Takaoka et al. | 369/100 |
| 4,980,879 | 12/1990 | Yamada | 369/100 |
| 5,068,677 | 11/1991 | Matsuura et al. | 359/217 |
| 5,113,279 | 5/1992 | Hanamoto et al. | 359/204 |

FOREIGN PATENT DOCUMENTS

| | | | |
|---|---|---|---|
| 2-160212 | 6/1990 | Japan | 359/204 |
| 2-259717 | 10/1990 | Japan | 359/204 |
| 3-2712 | 1/1991 | Japan | 359/204 |

OTHER PUBLICATIONS

Applied Optics, vol. 4, No. 6, Jun. 1965, pp. 759-761.

*Primary Examiner*—Bruce Y. Arnold
*Assistant Examiner*—James Phan
*Attorney, Agent, or Firm*—Mark Z. Dudley

[57] ABSTRACT

Laser beam scanning system combines multiple light beams to achieve a selectable intensity, high power scanning beam. A polarizing beam splitting prism of the Thompson type is employed as a multiple input beam combiner. The input laser beam components can be made selectively coincident or closely parallel to form an output beam which is then redirected in a scanning motion and focused to an exposure plane.

11 Claims, 2 Drawing Sheets

THRESHOLDED, HIGH POWER LASER BEAM SCANNING SYSTEM

CROSS REFERENCE TO RELATED APPLICATION

This application is related to commonly assigned U.S patent application Ser. No. 07/890,407, entitled MULTIPLE WAVELENGTH LASER BEAM SCANNING SYSTEM and filed in the names of J. Roddy and B. Narayan on even date herewith.

FIELD OF THE INVENTION

The present invention relates to a laser beam scanning system.

BACKGROUND OF THE INVENTION

In constructing a light beam scanning system, there may be a need to combine multiple light beams to: achieve a high power density scan exposure of a medium, increase throughput by writing sequential lines at higher scan rate, write plural lines simultaneously, or provide output beams of selectable power (such as the provision of a preheating or erase scanning beam at a leading scan position, followed by a write beam at a following, or lagging, scan position).

These applications have heretofore required the use of atypical high power laser beam source to produce an output beam of higher power density than achievable by common beam sources. For example, image and/or information signal recording media such as dye transfer or phase change media require on the order of one million ergs/$^2$ for exposure. A compact laser source offering power levels from 100 mW to 1 W is favored for such applications; however, such devices, if available, are costly to manufacture and difficult to use because the task of modulating such a source over a large range of output values induces the laser source to mode hop (change wavelength). Another drawback is that any associated optical systems that rely on diffraction effects (such as a hologon beam deflector) will suffer from undesireable mode hop artifacts, such as an angular shift in the scanning beam. In a laser hologon-based printer, for example, mode hop causes the exposure of illegible characters.

It is known in the optical art to provide the alignment of plural input beams into an output beam by use of a beam splitter operated in a reversed orientation.

However, the beam splitters proposed heretofore for beam combination, such as multi-layer dielectric coated mirrors, grating element, and pellicle beam splitters, exhibit a host of drawbacks. The named beam combiners are inefficient (i.e., they exhibit an undesireable amount of beam power loss) and are undesireably sensitive to factors such as the separation angle of the input beams and the ambient temperature. These drawbacks would be especially disadvantageous when the beam combiner is operated in a scanner wherein the radiometric accuracy of the output beam must be accurately maintained.

For example, as proposed by Tateoka in U.S. Pat. No. 4,634,232, two glass triangular prisms, one of which is coated with a polarizing multilayer mirror coating, are cemented together so that the mirror surface is on the cube diagonal. The multilayer mirror is typically a series of quarter wave interference coatings. The mirror surface transmits a first beam of one polarization and reflects another beam polarized orthogonally to the first beam. The passband, and hence the reflectivity and transmissivity of the mirror, is temperature, wavelength, and angle sensitive. Typically, only 80% of P-polarized light is transmitted and 90% of S-polarized light is reflected. Furthermore, the polarization purity of each beam component in the resulting output beam is unacceptable for some applications. The leakage component causes interference and the resultant output beam intensity fluctuations can be quite objectionable.

Beam combiners formed from certain birefringent elements have been proposed for single wavelength multiple beam combiners. For example, a beam combiner in the form of a Wollaston or Rochon prism was proposed by Tatsuno et al. in U.S. Pat. No. 4,822,151 to combine phase-locked input beams emanating from a diode laser array operating at a single wavelength. However, such a beam combiner is more complicated than desirable to construct, and if there are errors in manufacturing, the beam combiner will not provide adequate beam overlap.

PROBLEM TO BE SOLVED BY THE INVENTION

A problem to be solved by the present invention is to provide an improved, thresholded high-power beam scanner operable for combining input laser beams into a scanning output beam, whereby beam scanning of an exposure medium may be effected without incurring the above-described deficiencies in the prior art.

SUMMARY OF THE INVENTION

The foregoing problems of the prior art are resolved by a laser beam scanning system capable of providing a selectable intensity, high power scan exposure. A first, high power laser beam source, operable at a high current under dc conditions, provides a first input beam at a level sufficient to irradiate an exposure media to near a predetermined threshold. A second, low power laser source is then easily modulated to provide a second input beam. The combination of the first and second input beams yields an output beam having a selectable power density that is capable of exceeding the predetermined threshold on demand. The first input beam source is thus operated in a stable thermal condition and the second input beam source may be operated over a small current range (10 to 50 mA). In one aspect of the invention, therefore, the multiple beam sources are advantageously operated in stable operating regions that are free of mode hopping.

Therefore, and according to the present invention, a polarizing beam splitting prism of the Thompson type, made of a birefringent material such as calcite, is employed as a multiple input beam combiner in a beam scanning system. In a preferred embodiment, two laser beam sources direct respective linearly polarized first and second input beams of orthogonal polarization to the input faces of the Thompson prism. The input beams are preferably separated by an approximately 45° separation angle. By aligning the input laser beams and then making minor rotations of the prism about two orthogonal axes (X and Y), the two input laser beam components can be made selectively coincident or adjacent to form the output beam, which is then collimated, redirected in a scanning motion, and focused to an exposure plane.

The contemplated system is operable over an extremely wide input beam wavelength range (350-2,200 nm) because the angle and direction of the output beam is not a function of input beam wavelength, and because the beam combining effect is accomplished without resort to interference effects. Moreover, the output beam intensity is insensitive to temperature variations and to changes in the separation angle and wavelengths of the input beams. An additional advantage is that the input beams are combined with greater efficiency (i.e., less power loss).

A laser beam scanning system constructed according to the present invention has particular utility in: apparatus for scan exposure of recording media, such as thermal dye, phase change, or ablative recording media; data recording apparatus, such as apparatus for effecting erase/read/write exposure of an optical disc; or in applications demanding a high power output beam, such as apparatus for high speed multicolor image writers for the printing and publishing industry. The system is contemplated as having utility in other image and/or information recording applications as well.

BRIEF DESCRIPTION OF THE DRAWINGS

To facilitate understanding of the following detailed description, like nomenclature and identical reference numerals are used to denote elements that are common more than one figure.

DETAILED DESCRIPTION OF THE INVENTION

Figure 1:
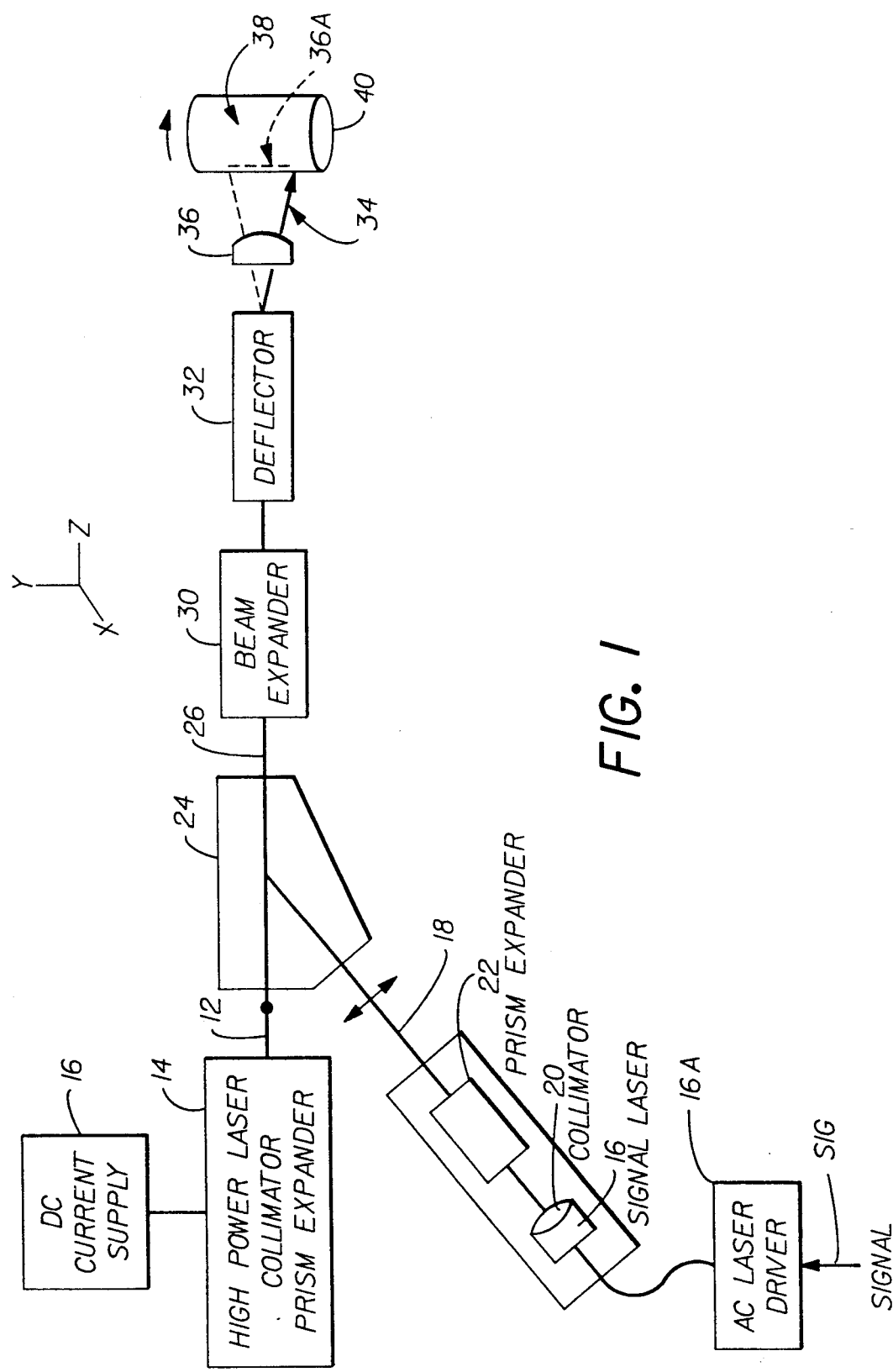
FIG. 1 is a simplified schematic illustration of a preferred embodiment of a light beam scanning system constructed according to the present invention.

A preferred embodiment 10 of a light beam scanner constructed according to the present invention is shown in FIG. 1. The input beam 12 from a first, high power input beam source 14 is vertically polarized and its major axis, assuming an elliptical beam, is horizontal. The preferred first beam source is a monochromatic coherent laser beam source such as a high power semiconductor laser diode or a solid state laser such as a Nd:YAG laser. The input beam 18 from a second, lower power signal input beam source 16 is horizontally polarized with its major axis vertical. The second beam source 16, preferably in the form of monochromatic coherent laser diode, is oriented so that it provides a second, horizontally polarized (along the X-axis) input beam 18. The first input beam intensity level is controlled by use of a direct current laser beam source supply 16 and the second input beam intensity level is controlled by an alternating current laser beam source supply 16A. An image or other information signal SIG is provided to the laser driver 16A to effect the requisite exposure control about a predetermined threshold in a fashion discussed below.

Both input beam sources may include known ancillary optical elements not shown. For simplicity in illustration, the second beam source 16 is shown as including a collimator lens 20 to collimates the second input beam 18 and a beam expander 22 in the form of a pair of prisms expands the beam horizontally to circularize it. The minor axes of the second input beam may be expanded with similar anamorphic prism expanders, which are commercially available, to circularize the beams. Mode stabilized laser beam sources, such as distributed feedback and short external cavity lasers, are preferred for their very large stable regions. Thermoelectric coolers can be used to tune the lasers to the same wavelength within the stable region and then hold the temperature and, therefore, the wavelength, constant.

The two linearly polarized input beams 12, 18 (which are orthogonally polarized with respect to each other) are introduced into a Thompson beamsplitting prism (hereinafter, Thompson prism) 24 at a separation angle S preferably approximately equal to 45°, although other angles are usable.

Figure 2:
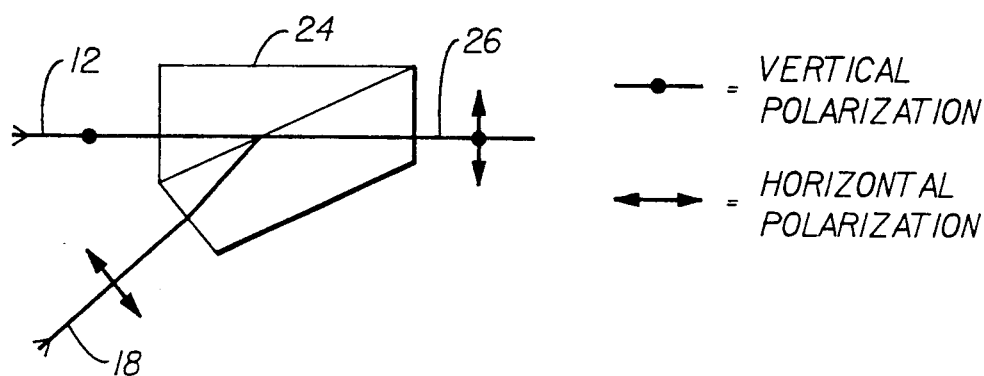
FIGS. 2 and 3 are a schematic ray tracing and a graphical representation, respectively, of the the input beam separation angle of the Thompson prism of FIG. 1.
Figure 3:
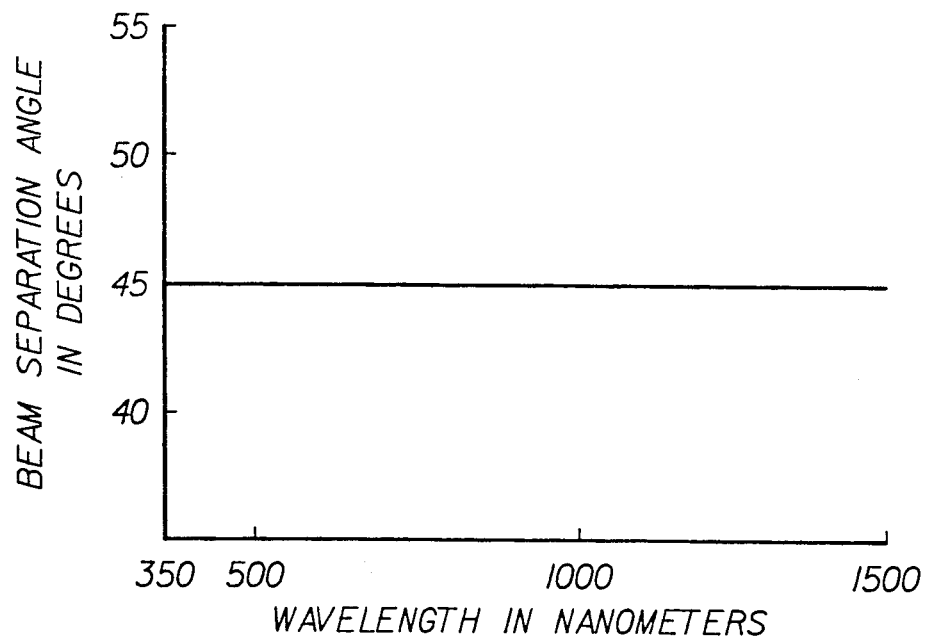

According to one aspect of the invention, and as further shown in FIGS. 2 and 3, the first and second input beams, having orthogonal polarizations, experience different indices of refraction in the Thompson prism 24 and are output from the prism as an output beam 26 having respective first and second input beam components. The two input beams 12, 18 are thus combined (made colinear) with each other to form the output beam 26. Output beam propagation is controlled by choosing the angle of the internal interface of the crystal components within the Thompson prism, and the crystal cut, such that one polarization is totally internally reflected and the other is transmitted at the internal interface.

It is preferred that both beam sources operate simultaneously and at a single predetermined (common) wavelength. And, although the input beams preferably have the same wavelength, in accordance with another aspect of the present invention, each input beam is combined without interfering with the intensity of the other because the first and second input beams are orthogonally polarized.

A preferred embodiment of the Thompson prism 24 is commercially available as a Thompson beam splitting prism, product number 03PTB001 from Melles Griot, Inc., Irvine, Calif., with active surfaces that are optically polished and widely separated (approximately 45°). According to one aspect of the present invention, and in contrast to prior art beam combiners, the Thompson prism 24 is recognized as providing an output beam that does not vary in angular direction as a function of input beam wavelength. Hence, input beams having a wide range of wavelengths may be combined into one output beam that exhibits a single, unvarying angular direction. The Thompson prism is preferably composed of calcite, although other birefringent materials can be used. A cemented version of the Thompson prism is excellent for low and medium power levels from milliwatts to several watts. An uncemented Thompson prism can be used for very high power levels.

Generally, the various devices of the system, such as the input beam sources, are aligned to the Thompson prism and to each other according to techniques known in the art. However, in particular and in accordance with a further aspect of the invention, it is contemplated that one may alter the coincidence of the first and second input beam components within the output beam 26 by rotating the Thompson prism 24. Rotation of the prism may thus compensate for small misalignments of the beam sources. Also, rotation of the prism 24 about the Z-axis will effect vertical displacement of the first and second input beam components in the output beam 26. Rotation of the prism about the X-axis similarly will effect a controlled horizontal displacement of the first and second input beam components in the output beam 26. As a result, the output beam 26 may be selectably formed of multiple, closely spaced parallel input beam components so as to provide, for example, respectively leading and lagging, or upper and lower, scanning beam spots. In the illustrated embodiment 10, it is preferred that the beam components be made colinear so as to coincide in a single beam spot. Alternatively, it is recognized that exposure of some media is improved by leading the second (low power) input beam component with the first (high power) beam.

The output beam 26 is directed through a beam expander 30 to a beam deflection means 32. Preferably, the beam deflector includes a stationary grating for mode drift compensation and a rotatable hologon beam deflector The stationary grating and the hologon are tuned to provide equal efficiency for S and P polarizations. The output beam 26 is then deflected by the beam deflection means 32 in a scanning motion and the scanning beam 34 is focused by an f-theta lens 36 to an exposure plane 36A. Alternative beam deflectors would include a rotable polygonal mirror beam deflector.

An exposure medium 38 is located at the exposure plane 36A to receive the scanning exposure. Preferably, the exposure medium is mounted on a moveable member 40 such that there may be relative movement of the scanning beam and the exposure medium in an orthogonal (cross scanning) direction. Alternatively, the exposure medium 38 may be mounted on a fixed member and the scanning and cross scanning motion may be imparted to the output beam 26 by the beam deflection means using techniques known in the art.

The first, high power input beam component in the scanning beam 34 is absorbed by the exposure medium and brings the medium near to a predetermined threshold exposure level. In accordance with the information provided by signal SIG, the second, low power input beam component in the scanning beam provides the extra energy needed to effect the change in the exposure medium. Continued scanning of the exposure medium renders a recorded image or body of information, depending upon the application. For example, the transition beyond the threshold may be used to sensitize, harden, or soften the exposure media; effect a transfer of a thermal dye donor component; or cause an ablation or phase change of the exposure media. Other modulation and exposure schemes may, of course, be accomplished.

It is contemplated in the present invention that the aforementioned embodiment can be modified to include more than two beam sources operating simultaneously. Multiple input beams may be directed to enter each facet of a single Thompson prism, and the output beam spot position would be adjusted by angularly adjusting the input beam sources.

Alternatively, two input beams may be combined by a first Thompson prism and emerge parallel but separated by a small distance such that a half wave plate can be inserted into the appropriate beam. Both parallel beams are then vertically polarized and are directed to a second Thompson prism where a third, horizontally polarized, input beam can be added. The output beam from the second Thompson prism may be deflected and focused to a beamspot on the exposure medium as described hereinabove.

If a coherent laser array is used to provide a set of respective input beams of precisely the same wavelength in precisely the same phase, two orthogonally polarized beams can be introduced into the first prism using polarization preserving fibers of equal length. The output will be linearly polarized at 45° to the mounting surface. A second Thompson prism, rotated 45° about the Z-axis to receive the first output beam from the first Thompson prism, can be used to add a third beam from the laser array. The second output beam (emanating from the second Thompson prism) is then vertically polarized and directed to one or more additional Thompson prisms.

Although a preferred embodiment of the present invention has been shown and described herein, other embodiments may be constructed without departing from the scope or spirit of the invention. Examples of additional applications of the foregoing embodiment, or variations thereof, are contemplated as including a high power laser beam scanning system for: achieving increased throughput by writing scan lines at high speed, providing a scanning output beam having a power density selected from a wide range, or providing a scanning beam that may act as a read or erase beam at one intensity level and a write beam at another intensity level.

What is claimed is:

1. A light beam scanning system comprising:
   multiple light beam sources for providing respective input beams;
   first control means for maintaining a first of said input light beams at a predetermined constant level of intensity;
   second control means, responsive to an information signal, for varying a second of said input light beams at a selectable level of intensity corresponding to the signal;
   a Thompson prism, locatable for receiving the input beams and for combining the input beams to form therefrom an output beam;
   means for deflecting the output beam to provide a scanning beam; and
   means for focussing the scanning beam to an exposure plane for effecting scan exposure thereon.

2. The beam scanning system of claim 1, wherein the light beam sources are monochromatic coherent laser beam sources, and each input beam being provided at a substantially common wavelength.

3. The beam scanning system of claim 2, wherein the first control means further comprises a direct current laser beam source supply.

4. The beam scanning system of claim 2, wherein the second control means further comprises an alternating current laser beam source supply.

5. The beam scanning system of claim 1, wherein the Thompson prism is rotatble about two orthogonal axes (X and Y) to make the two input laser beam components in the output beam selectively coincident or adjacent.

6. The beam scanning system of claim 1, further comprising beam expansion means for expanding the output beam.

7. The beam scanning system of claim 1, wherein the deflecting means further comprises a rotable hologon-based beam deflector.

8. The beam scanning system of claim 1, wherein the deflecting means further comprises a rotable polygonal mirror-based beam deflector.

9. The beam scanning system of claim 1, further comprising:
   an exposure medium locatable at the exposure plane; and
   means for effecting differential movement between the exposure medium and the scanning beam in a sub-scanning direction.

10. The beam scanning system of claim 9, wherein the information signal is provided according to image information to be recorded on the exposure medium.

11. The beam scanning system of claim 1, wherein the focussing means further comprises an f-theta lens.

* * * * *